United States Patent [19]

DiBianca et al.

[11] 4,429,227
[45] Jan. 31, 1984

[54] SOLID STATE DETECTOR FOR CT COMPRISING IMPROVEMENTS IN COLLIMATOR PLATES

[75] Inventors: Frank A. DiBianca, Chapel Hill, N.C.; Dennis H. Pritzkow, New Berlin; Thomas E. Peterson, Greendale, both of Wis.

[73] Assignee: General Electric Company, Waukesha, Wis.

[21] Appl. No.: 335,183

[22] Filed: Dec. 28, 1981

[51] Int. Cl.³ .......................... A61B 6/00; G01T 1/20
[52] U.S. Cl. ..................................... 250/367; 378/19; 378/154
[58] Field of Search .................. 378/19, 154, 147; 250/367

[56] References Cited

U.S. PATENT DOCUMENTS

| | | | |
|---|---|---|---|
| 4,031,396 | 6/1977 | Whetten et al. | 250/385 |
| 4,119,853 | 10/1978 | Shelley et al. | 250/385 |
| 4,161,655 | 7/1979 | Cotic et al. | 250/385 |
| 4,180,737 | 12/1979 | Kingsley | 250/367 |
| 4,181,856 | 1/1980 | Bone | 250/366 |
| 4,187,427 | 2/1980 | Cusano | 250/366 |
| 4,220,860 | 9/1980 | Carlson et al. | 378/19 |
| 4,292,525 | 9/1981 | Tschunt | 378/19 |

*Primary Examiner*—Alfred E. Smith
*Assistant Examiner*—T. N. Grigsby
*Attorney, Agent, or Firm*—Leydig, Voit, Osann, Mayer & Holt, Ltd.

[57] ABSTRACT

A modular solid state x-radiation detector. A detector array is made up of a plurality of collimator plates having pockets formed in the planar surfaces thereof to carry scintillator bars, and dimensioned so that the edges of the scintillators are shielded by the pockets, yielding several advantages. Wider scintillator bars are thus possible, increasing quantum detection efficiency while guarding against energy dependent punch through at the edges of the scintillator, thereby to enhance spectral linearity. The arrangement also prevents x-rays from bypassing the scintillator, thus protecting the adhesive which bonds the scintillator to the plate and the photodiodes mounted behind the scintillator. A further benefit is an increase in optical transfer of light to the rear of the scintillator where the diode is mounted since there is a less severe aspect ratio of depth to width, reducing the number of reflections encountered by light travelling to the photodiode. The collimator plates are also provided with opposed legs which engage slots in a photosensor assembly to accurately align the photosensor and scintillator.

8 Claims, 5 Drawing Figures

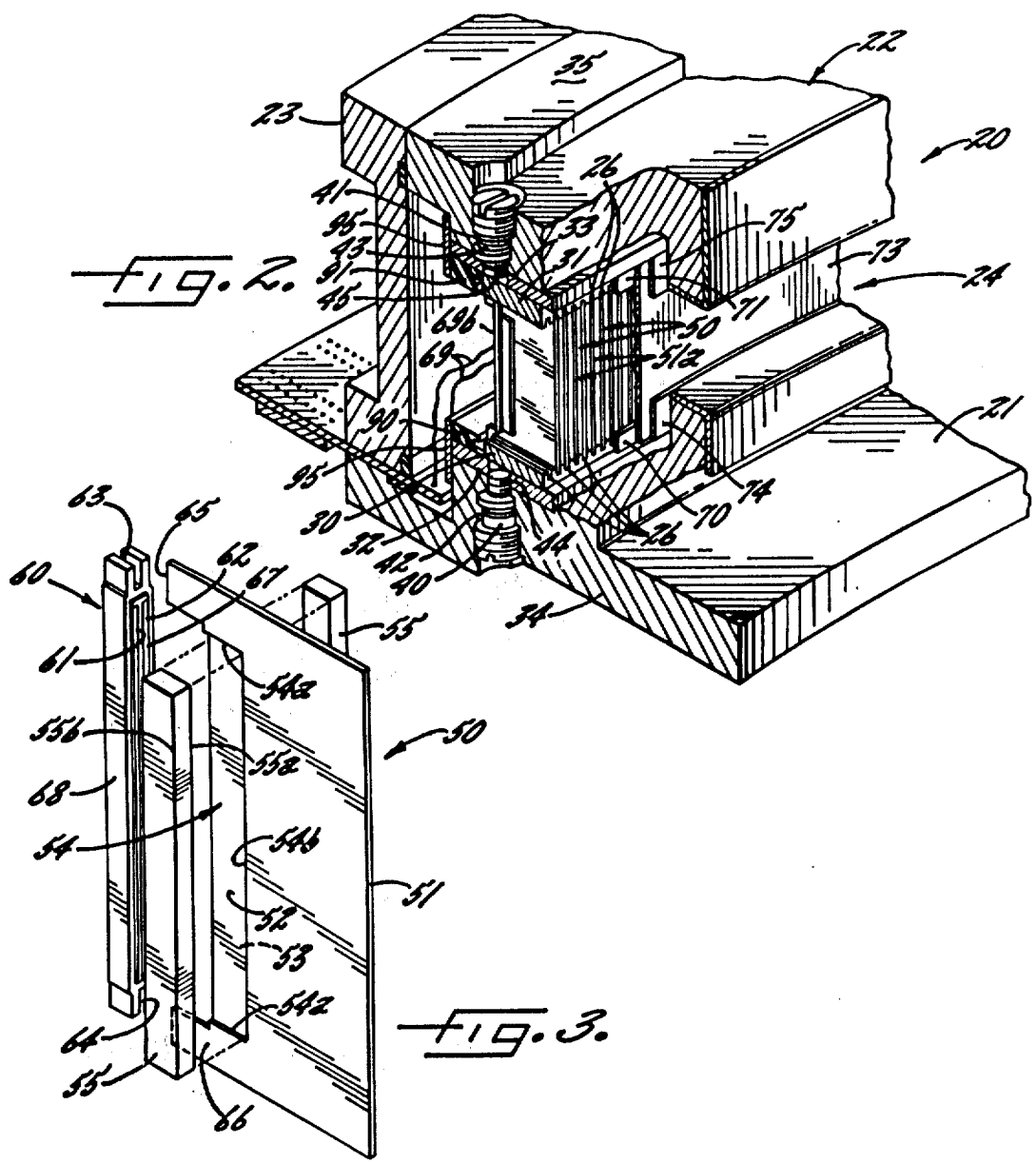

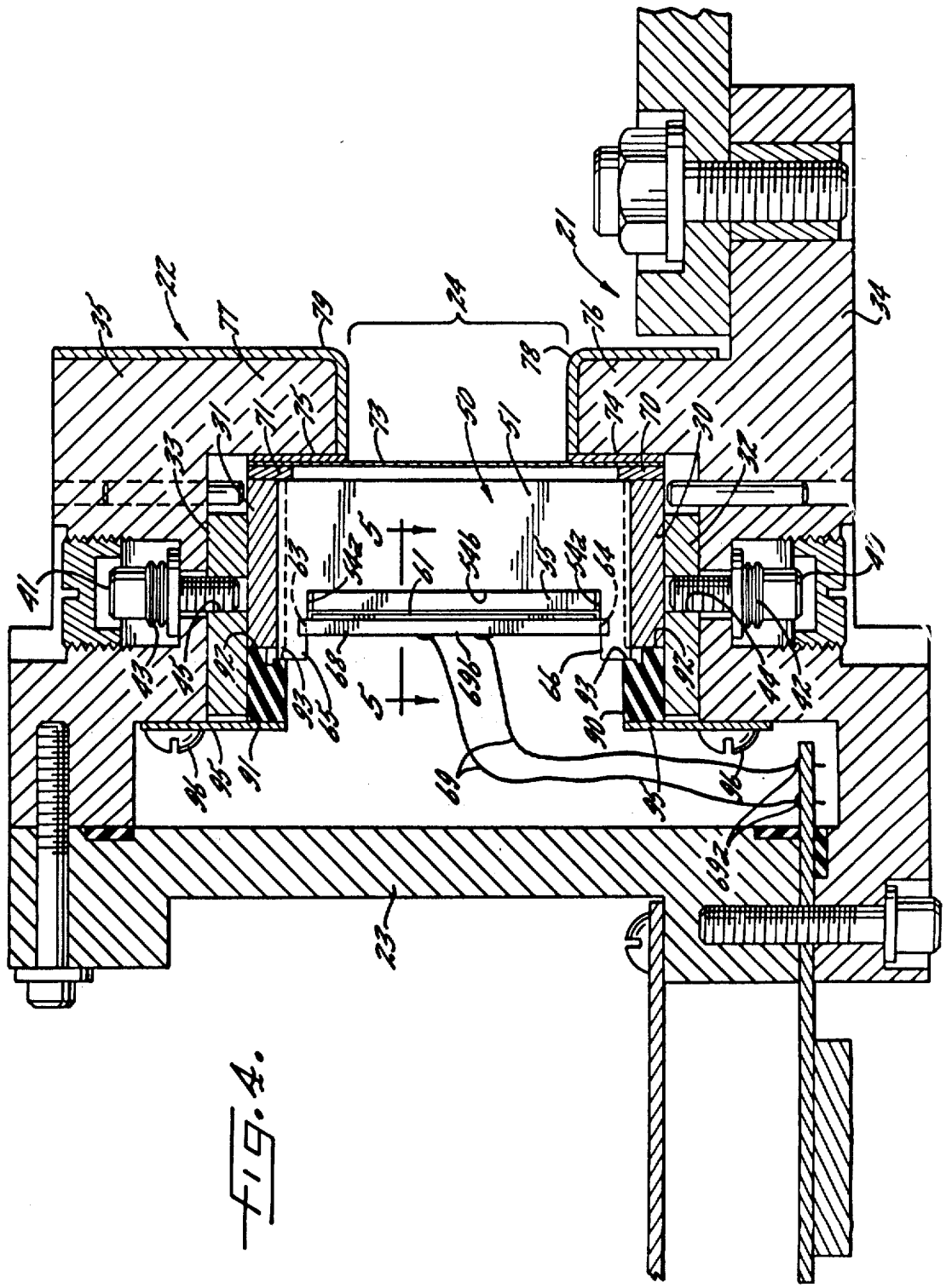

SOLID STATE DETECTOR FOR CT COMPRISING IMPROVEMENTS IN COLLIMATOR PLATES

This invention relates to X-ray detectors (apparatus for converting incident X-ray photons into a measurable electrical signal) and more particularly to the class of X-ray detectors which have come to be known as "solid state".

Detectors of this sort have an important use in CT scanners. In contrast to the early primitive scanners using only one or a very small number of detectors, modern scanners incorporate hundreds of detector cells, attempt to pack them as tightly as practical to increase spatial resolution, and make them as efficient as practical in order to increase contrast resolution.

A successful CT detector is described in the following U.S. Pat. Nos.: Whetten et al. 4,031,396; Shelley et al. 4,119,853; and Cotic et al. 4,161,655. That type of detector uses xenon gas under high pressure and operates on the principle of detecting X-rays by their proportional ionization of the xenon gas. The ionization charge in the xenon gas is collected in an electric field established by spaced parallel tungsten plates and the charge collected is proportional to the number of X-rays absorbed in the gas.

While high pressure xenon detectors of that type have met with considerable success, certain improvements would be of even further benefit to the CT art. Improvement in the quantum detection efficiency, typically about 50%, would allow increased contrast resolution or decreased dose or both. Due to the high voltage electrical fields within the xenon detector, microphonics (induced plate motion effects) can become a problem, requiring rigid construction and vibration isolation. Linearity, that is, cell to cell response matching, requires very careful screening procedures for the components. Due to the fact that the system will not work as an X-ray detector until it is charged with gas, uniformity is not finally determined until the cell is completely assembled. An out of specification condition requires complete disassembly and rework.

While the aforementioned problems are not insurmountable in producing a practical xenon detector, adoption of a solid state approach can avoid many of the consequences.

Among the solid state detectors proposed heretofore is the reflective cavity cell shown in Cusano U.S. Pat. No. 4,187,427. The interior of each cell is rendered highly reflective in order to minimize optical losses in transmission of light from the scintillating crystal to the photodetector diodes positioned at the ends of the cell. That patent suggests mounting the sensing diodes external to the cell (to protect them from incident radiation), but creates the possibility of light leakage between the cells causing cross talk. In addition, the diodes must be carefully aligned with their associated cells during the assembly operation, requiring a high degree of care on the part of the assembler. Finally, the sensing diode and its scintillating crystal are first associated during the assembly operation, and can be disassociated by replacing or relocating one but not all of such elements.

In many CT systems a tightly packed array of scintillating elements for receiving the X-radiation and converting it into a measurable electrical signal is used. Usually a collimator, that is, a means for limiting the angle over which the X-radiation can enter the scintillator, is provided. In scintillating element detectors of the type having a rectangular parallelepiped scintillator bar, the detector response with respect to the incident X-ray energy depends upon the deviation of the scintillator from a perfect rectangular parallelepiped, and typically requires deviations of less than one part in a thousand. The detector response also depends, to some degree, upon the scattering of incident X-rays from any collimating means onto the scintillator element. It is desirable to have an X-ray detector wherein collimator scattering is reduced and the dependence upon deviation from a perfect rectangular parallelepiped shape of the scintillator element is decreased.

One approach for accomplishing that is shown in Kingsley U.S. Pat. No. 4,180,737. That patent suggests thickening the end of each collimator plate at the cell entrance or window in order to shield the very edges (longitudinal corners) of the scintillator element. The need for such a shield can be described as follows. If the scintillator is slightly skewed, or if it is not a perfectly rectangular parallelepiped, then the sides will not be perfectly perpendicular to the scintillator face. As a result, the depth of the crystal at the edges will likely be less than the average crystal depth, and will thus have reduced X-ray stopping power. While the edges might be capable of stopping (and thus converting) relatively low energy radiation, higher energy radiation will punch through and will not be converted. As a result, the conversion efficiency of the cell will vary with energy level, and will be different from cell to cell, thus creating spectral non-linearities.

While the shielding approach suggested in the Kingsley patent is effective to reduce this spectral non-linearity, it does so at the cost of conversion efficiency. More particularly, the cell aperture is effectively reduced by the thickening members, preventing radiation which passes through the patient and falls on the thickening members from contributing to the useful signal.

Accordingly, it is an object of the present invention to provide an improved X-ray detector which enhances spectral linearity, but which also has a high conversion efficiency.

According to a more detailed aspect of the invention, it is an object to provide such an X-ray detector in which the scintillator and collimator plates are arranged so as to shield the detector elements which might be degraded by incident X-ray flux.

An additional object is to provide such an X-ray detector in which optical transfer of light to the rear of the scintillator is enhanced.

It is another object of this invention to provide a detector wherein the scintillator member and photoresponsive means are accurately registered.

These and other objects and advantages of this invention will become apparent from the following detailed description when taken in conjunction with the drawings in which:

FIG. 1 is a perspective view showing a detector array exemplifying the present invention;

FIG. 2 is a partial sectional perspective taken along the line 2—2 of FIG. 1;

FIG. 3 is a perspective view showing a single collimator plate with associated elements;

FIG. 4 is a sectional view taken along line 4—4 of FIG. 1; and

Figure 5:
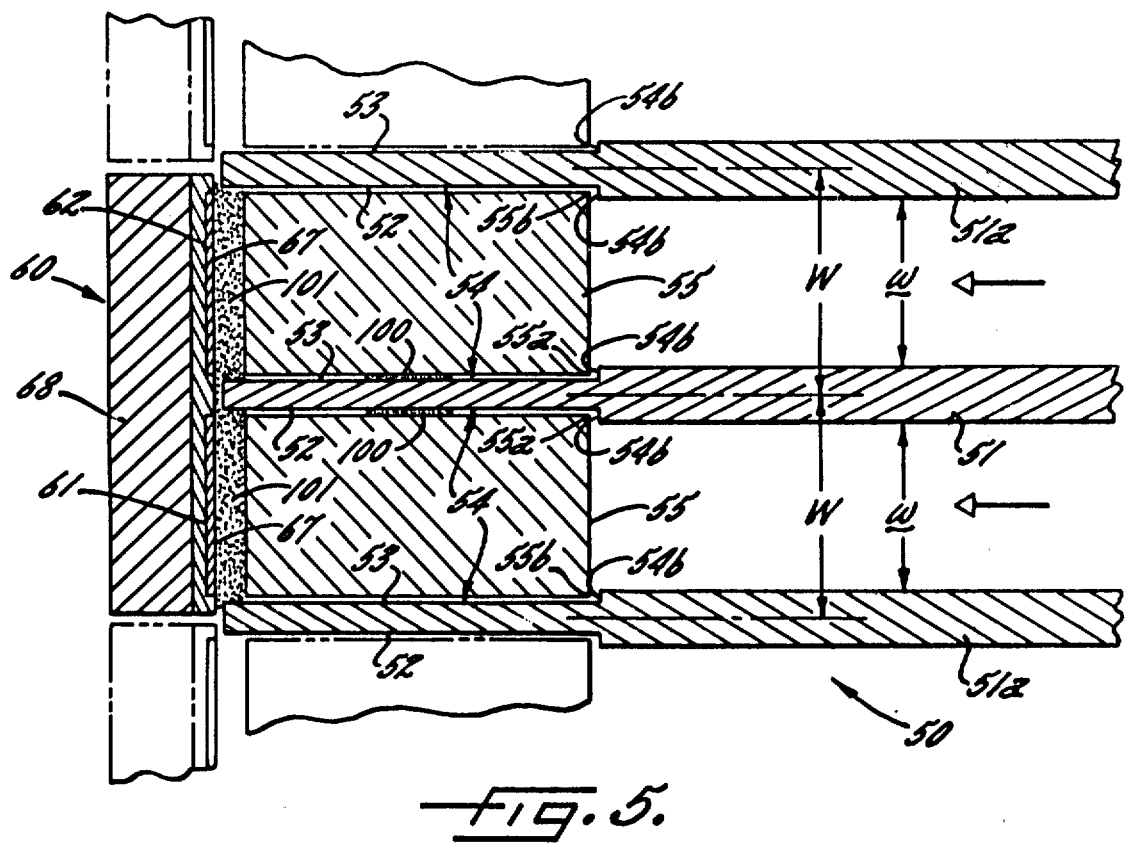
FIG. 5 is a view taken along the line 5—5 of FIG. 4 showing a plurality of detector cells in a detector array.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, FIG. 1 shows a detector assembly of the type particularly suited for use in a rotate-rotate CT scanner. The detector has a housing 20 which is arcuate in shape, and which includes a pair of end members 21, 22, a rear wall 23 and a front window 24 enclosing a volume containing a plurality of detector cells. When disposed in a CT scanner, the detector array 20 is mounted opposite an X-ray source (not shown), with the focal spot of the source being located at the geometrical center of the detector arc. The X-ray source and detector are fixed with respect to each other so that a fan beam swath of radiation produced by the source falls on the detector window 24 to cause the production of a plurality of electrical signals, one from each cell within the detector assembly. The source-detector assembly is rotated about a patient aperture to produce a large number of X-ray readings which are transmitted to the reconstruction computer which computes the CT image.

As best shown in FIG. 2, each of the end members 21, 22 of the housing 20 is a composite assembly having a plurality of slots 26 for receiving the detector cell assembly to be described below. The slots are aligned with the X-ray source so that, with the detector elements in place, a plurality of detector cells are created which measure incident radiation in small increments over the detector arc. For the sake of convenience and because of the proven reliability for accurately mounting tungsten plates in a CT detector, a precision, dimensionally stable, machined ceramic substrate used in a commercial embodiment of the aforementioned xenon detector (and described in the aforementioned Shelley patent) is preferably employed for the purpose of providing the opposed unitary cell mounting slots. To that end, arcuate machineable glass ceramic sections 30, 31, preferably of Macor (trademark designation of Corning Glass Works for machineable glass ceramic), have precision machined therein a plurality of slots 26 which establish the cell position and spacing for each of the cells in the detector array. For convenience, the Macor sections can be modularized in 6 or 7 inch lengths for assembly in end to end fashion. The sections are bonded to mounting substrates 32, 33, preferably of titanium or type 430 stainless steel which have a thermal coefficient of expansion which closely matches that of Macor. Other compatible materials can be used if desired. The so-bonded subassemblies are then located within the detector body comprising arcuate members 34, 35, preferably of aluminum, joined at a predetermined distance by end members 36, 37 (FIG. 1). The assembly is further rigidified by the affixation of rear cover 23. Because the aluminum members have a coefficient of thermal expansion substantially different from the Macor-stainless steel subassemblies, the composite end members 21, 22 are brought together by means adapted to allow relative movement between those elements. More particularly, cap screws 40, 41 acting through bellville washers 42, 43 into threaded holes 44, 45 in the stainless steel substrates tend to draw the substrates with bonded Macor plates to the aluminum channels. As best shown in FIG. 4, sufficient clearance is left between the shank of the cap screws 40, 41 and the aluminum bodies 34, 35 to allow for slight relative movement which might be caused by a change in temperature.

Associated with the mounting structure described above, are a plurality of detector units 50 having scintillator bodies and photosensors associated therewith for transforming incident X-ray flux to a measurable electrical signal. Preferably the detector units are configured to carry such elements for a pair of adjacent cells. More particularly, as shown in FIG. 3, the detector unit 50 comprises a plate 51 of tungsten or other high density material for carrying a pair of scintillator bars 55, associated with a pair of photosensors 61, 62 of a photosensor assembly 60. As suggested in FIG. 2, the detector units 50 are slid into the Macor slots, alternating in position with plates 51a, identical in configuration to plate 51, but carrying no scintillators or photodiodes. There are thus formed a plurality of detector cells for measuring incident X-ray flux received therein, in increments determined by the spacing between the plates 51, 51a.

In accordance with an important aspect of the present invention, the plates 51, 51a are formed with pockets (pocket 54 being illustrated in FIG. 3) dimensioned to receive the scintillator body and shield the very edge thereof from incident X-radiation. More particularly, the pocket 54 provides a pair of walls 54a spaced by a dimension slightly greater than the length of the scintillator body, and a protective wall 54b for shielding the longitudinal corner 55a of the scintillator body from incident X-radiation. As a result, if the scintillator body is skewed or is not a perfectly rectangular parallelepiped, and the edge thereof is thus of lesser dimension than the average scintillator depth, the protective wall 54b shields such edge from incident X-radiation, preventing energy dependent punch through. Similarly, the edge 55b is protected by the pocket in the plate 51a with which it is associated when it is inserted into the detector array. [Note ahead that the scintillators are bonded to the plates within the pockets.]

It should be noted that the depth of the pockets is not critical so long as the desired shadowing of the scintillator body is achieved. In the preferred embodiment, the base plate has a thickness of about 8 milli-inches, and each of the pockets on either side of the plate has a depth of about 2.5 milli-inches. The scintillators are preferably fixed within the pockets of the plates 51 by a suitable bonding agent. The described structure accomplishes the shielding of the scintillator edges while avoiding the significant decrease in quantum detection efficiency inherent in the approach described in the aforementioned Kingsley patent.

In order to maximize light collecting efficiency within the cell, the pockets 54 of the tungsten plates 51, 51a, after being chemically etched, are then surface coated on both faces 52, 53 with a highly reflective material. It is presently preferred to apply a thin layer of silver or aluminum by evaporative or sputter coating techniques, following which a suitable protective coating such as magnesium fluoride, silicon monoxide, silicon chloride, or the like is applied.

It is desirable to place the photoresponsive means directly behind the scintillating body because the light path to the scintillating body is shorter than if the photoresponsive means were placed elsewhere, as for example, at the longitudinal edges of the scintillator as in the aforementioned Cusons patent. In order to accomplish that, it is necessary to protect the photoresponsive means from X-radiation. The pocketed mounting arrangement is important in protecting the photodiode because it eliminates any straight line path for flux to travel from the detector window, past the scintillator to the diode. Secondly, shielding of the scintillator corner minimizes punch through, a further source of flux potentially reaching the diodes. Finally scintillators having a high X-ray stopping power, and of sufficient thickness to stop over 99% of the X-radiation, are utilized. Suitable scintillators for this purpose are known to the CT art, a currently used example being cadmium tungstate. Further, to enhance the light collecting efficiency within the cell all of the scintillator surfaces except the rear surface which faces in the direction of the photoresponsive means are treated to make them reflect inwardly. In the preferred embodiment a specular reflector, which comprises an air gap longer than a wavelength of light followed by a highly reflective metallic surface, such as, for example silver or aluminum coated with magnesium fluoride or silicon oxide, is located at the end portions of the scintillator (which face the ceramic sections 30, 31), and on the side surfaces of the scintillator (which face the collimator plates). In fact, the ceramic sections (covered with the desired metallic surface) and the collimator plates serve as the reflective surfaces of these reflectors. The face of the scintillator, that is, the surface facing the detector window, is highly polished and may carry a reflective coating, which may be a specular reflector such as, for example, silver, aluminum, gold, or a diffuse reflector such as, for example, magnesium oxide, titanium oxide, barium oxide or the like. The reflector may be either directly deposited or mounted on a thin, X-ray transparent member so as to allow an air gap to be present. Thus, light emitted by the scintillator in response to X-radiation will be directed largely towards the photoresponsive means.

In practicing one aspect of the present invention, photoresponsive means are associated with the scintillators 55 in such a way as to provide a module having a pair of scintillator accurately registered to an associated pair of photosensors. Turning to FIG. 3, a PIN photodiode assembly 60 comprises two distinct diodes 61, 62, for converting light emitted by the scintillator into a measurable electrical signal. The active diode sensing surfaces, indicated at 67, substantially cover the entire end of the associated scintillator and are spaced by about the thickness of the collimator plate. The active diode element is bonded by means of conductive epoxy to a substrate 68, which is preferably a ceramic material having a coefficient of thermal expansion very near that of the associated tungsten plate 51. The diode assembly is positioned on the plate 51 by means of slots 63, 64 formed in the substrate 68 which engage legs 65, 66 formed in the plate 51, so that one diode of the diode assembly is accurately registered with the scintillator 55 on one side of the plate 51, and, at the same time, the second diode of the diode assembly is accurately registered with the scintillator 55 on the other side of the plate 51. Thus, with this arrangement, each diode converts only the light generated by its associated scintillator in response to receipt of X-ray flux into a measurable electrical signal.

In order to enhance the transfer of light from the scintillator to the diode, the surface of the scintillator facing the diode is roughened, as, for example, by etching; and the diode and its associated scintillator may, for optimized light output, be optically coupled by a suitable medium, such as, for example, optical grease, a suitable flexible epoxy or the like.

Preferably the diodes are operated in the photovoltaic mode, and the current produced thereby is sensed as a measure of incident X-ray flux. A pair of wire leads 69 connect the active diode element to a printed circuit conductor 69b embedded in the substrate 68 for attachment of wires to connect the cell to the remaining CT electronics.

It is important to note that it is advantageous to form the detector cell having the diode assembly accurately located on the collimator plate, as described heretofore, for several reasons. First of all, cross talk which might otherwise occur between cells, particularly in detectors wherein diodes are disposed above the collimator plates and outside the cells is substantially reduced or eliminated. Further, each detector provides a complete module which may be tested independently of other units. Also there is less tolerance build up since each detector stands independently of the other detectors utilized in the detector array. An additional advantage is the accurate cell positioning achieved by rendering the plate compatible with the aforementioned precision slotted structure.

It is worthy of note that each detector unit is susceptible to pre-screening in a fixture to predetermine its characteristics after manufacture and before assembly in an array. Accordingly, it is possible to grade cells for acceptance or rejection according to actual measured characteristics and group cells with similar characteristics for later installation in proximity.

The ability either to prescreen cells for matching characteristics, or to exchange cells within an array depending on array performance is particularly important when it is appreciated that it is desireable to have each cell respond like its neighbors, but that some cells are more important than others to the reconstructed image. More particularly, the most important cells in the entire array are those in the center since they sense the rays through the center of the object and the central pixels (picture elements) in the reconstructed image receive repeated contributions in every view from their central detectors. The least important are those at the edges of the array which sense rays which pass through only the edge portions of the body. It has been found the optimizing approximately the center 50 cells with respect to linearity and performance, is most important and that the remaining cells outboard thereof, while of importance, need not be given the same attention as the middle 50. Thus, since the unit cell described and claimed herein makes it possible to pre-screen cells for exactly matched characteristics (or to build an array, test it then interchange cells), the center 50 can be matched to the greatest extent possible, to yield even more accurate reconstructions.

While the detector units 50 and associated collimator plates 51a can be mounted in the detector array in various ways, such as by epoxy bonding utilized in the aforementioned xenon detector, or by various other mechanical means, we prefer to utilize the resilient mounting techniques described and claimed in Hoffman et al. U.S. application Ser. No. 236,738, assigned to the same assignee as this invention. That application describes a detector which performs the functions of minimizing absorbed radiation in the front window and preventing cross talk around the trailing edge of the plate between cells. Associated with a front window of that character are resilient means for urging a plurality of plates against a front stop to fix firmly but resiliently the plates in position.

Before describing the details of the mounting arrangement, it will first be noted that the detector units 50 and collimator plates 51a are slid into their associated Macor slots from the rear of the detector assembly. The collimator plates 51a (those which do not carry scintillators or photodiodes) are first slid into the array in alternate positions. The detector units 50 are then inserted into the intermediate slots. By virtue of the fact that the pockets 54 do not have rear walls, the detector units can be slid into position without interference while still assuring that the scintillator edge 55b is shadowed by the pocket of the adjacent collimator plate 51a.

Referring now more particularly to FIGS. 2 and 4, there are shown a pair of front stop members 70, 71 associated with the slotted portion of the end members 21, 22. The stop members are arcuate in shape and, in order to provide a thermal match with the slotted support, can be made from titanium or type 430 stainless steel, as are the base plates 32, 33. Preferably, the members 70, 71 are bonded to the Macor elements 30, 31 for defining an arcuate plate reference position for each plate in the assembly.

For sealing the array from entry of external light while at the same time minimizing absorption of X-ray flux, the front window 24 is closed by means of a graphite window element 73. Preferably, the window is formed of a non-metallic base made up of three or more layers of graphite fibers, each layer woven into a cloth and bonded together with epoxy. The epoxy composition is optimized to provide a good thermal match to the tungsten and Macor elements in the cell. Preferably gasket strips 74, 75 are disposed between ribs 76, 77 of the aluminum end members and the graphite window. The ribs 76, 77 also provide convenient surfaces for mounting lead shields 78, 79 which define the window 24.

As described in the aforementioned Hoffman et al. application, acting in concert with the window elements described above are resilient means for forcing a plurality of unitary cells into the front window to both accurately position each cell and produce the desired light seal. To that end, there are provided a pair of resilient locking members 90, 91, preferably neoprene rubber having a durometer of about 50. The rubber elements are preferably on the order of one or two inches long so that they are associated with a limited number of cells. Each element has a major leg 92 for engaging the Macor slotted elements 30, 31 and a minor leg 93 for simultaneously engaging a corner of the plate 50. A non-resilient member, such as plate 95, of the same length as the resilient mounts 90, 91 is secured to the rear inner surface of the aluminum housing by screws 96, thereby engaging the major leg 92 with the Macor base and slightly deforming the minor leg 93 by contact with the edge of the plate, positively forcing the plate to and holding it in the plate reference position with its forward edge against the stops 70, 71.

In the manufacturing operation (or in field replacement if necessary) there are no critical tolerances which need attention from the workman when inserting or interchanging cells. More particularly, the critical tolerances are achieved by a fixture and jig in the factory when the diode, scintillator and other elements are associated with each other. When a plate is to be inserted, it need only be slid into its slot and locked in position. When the preferred resilient mount is used, it forces the plate in question and its neighbors into the reference position and, at the same time creates a light seal. If it is desired to change a cell in the field, the serviceman need only remove the plates 95 for the cell in question, lift out the resilient mounts 90, 91, for the cell in question, unsolder the two wires from the DAS interconnect board 69a for the cell in question, then slide the cell from its mount. A new cell is replaced by simply reversing the operation while the serviceman need give no attention to critical tolerances since they are automatically achieved when the cell is relocked in position.

The advantages attendent to the invention can be more fully appreciated with reference to FIG. 5. There it is clearly seen that two types of collimator plates 51, 51a occupy alternate positions in the detector array. The plate 51 has bonded thereto (the bonding material being indicated at 100) a pair of scintillators 55. The plates 51a, occupying slots on either side of the plate 51 serve to define the cell for the scintillators in question as well as for the next adjacent cells (partly illustrated in broken lines).

The photoresponsive assembly 60 (which it is recalled is accurately located with respect to the detector unit 51 by slots engaging the legs of the collimator plate), is positioned behind the pair of scintillators 55 such that the active surfaces 67 of the photodiodes 61, 62 cover the area of the scintillator and are in proximity therewith for receiving light therefrom. The optical grease or other optical coupling medium is illustrated at 101.

FIG. 5 illustrates that the protective walls 54b of the pockets 54 serve to shield the very edges (or longitudinal corners) of the scintillator from incident flux. As a result, if the scintillators are not perfectly rectangular parallelepipeds, X-rays are prevented from passing through the leading corners, preventing the phenomenon of energy dependent punch through which would otherwise cause spectral nonlinearities. It is important to note that this is accomplished without substantially reducing the quantum detection efficiency of the cell.

More particularly, the quantum detection efficiency is proportional to the ratio between the active cells width w and the cell spacing W. Assuming W is the same for each of the structures shown in the present application, the aforementioned Hoffman application and the aforementioned Kingsley patent, the following results obtain. Using the structure of the present invention, the full cell width w is available to receive X-rays, thus making quantum detection efficiency proprotional to w/W. Using the structure shown in the aforementioned Hoffman application, and assuming that the cell spacing W remains the same as in the instant application, the cell width is slightly less than w because of the mechanical clearance required between the scintillator carried on a plate and the adjacent plate, such clearance being required for assembly. Accordingly, the quantum detection efficiency of that structure is less than shown in the instant application; in addition, no means are provided for preventing energy dependent punch through.

According to the structure shown in the aforementioned Kingsley patent, energy depenent punch through is prevented, but at the expense of quantum detection efficiency. More particularly, assuming the cell spacing W remains the same as shown in the instant application, the detector width is substantially reduced from w because of the thickening members at the entrance of each cell. Thus, while Kingsley does prevent energy dependent punch through, the quantum detection efficiency is much less than shown in the instant application.

Other advantages are also achieved by the instant structure. It is seen in FIG. 5 that there is no direct line path for flux from the detector window through to the diode because of the shielding of the scintillator corners 55a, 55b by the associated protective pocket walls 54b. Thus, flux which might degrade diode characteristics or degrade the signal produced by the cell is prevented from falling directly on the photodiodes. It is also seen that the bonding material 100 is shielded from incident flux which might otherwise cause it to become weak and brittle.

It will now be appreciated that there has been provided an improved solid state detector cell which accomplishes the ends of preventing energy dependent punch through while maintaining good quantum detection efficiency, and at the same time shielding detector elements from X-ray flux which might otherwise be degraded thereby.

What is claimed is:

1. In a scintillation detector for a X-ray scanner, the improvement comprising a scintillator, a collimator plate having a narrow pocket formed in at least one face thereof, the pocket being dimensioned to receive the scintillator and having a protective wall shielding the longitudinal corner of the scintillator to prevent X-radiation from impinging on said corner or bypassing said scintillator.

2. The improvement as set out in claim 1 wherein the protective wall shields the longitudinal corner to a sufficient extent to minimize energy dependent punch through, at the longitudinal corner thereby to improve spectral linearity of said detector.

3. The improvement as set out in claim 1 further including photoresponsive means having a pair of opposed slots, the collimator plate having a pair of opposed legs extending therefrom and dimensioned to receive said slots for registering the photoresponsive means with respect to the scintillator.

4. In a scintillation detector for a X-ray scanner, the improvement comprising a collimator plate carrying a scintillator on each face thereof, a photosensor having a base support and a first and second active surface carried on said base support, the active surfaces being spaced by about the thickness of the collimator plate and having a rectangular shape about the same as the scintillator face, the collimator plate having a pair of opposed legs, and the base support having a pair of opposed slots dimensioned to receive said legs for supporting each of said active surfaces in accurate registration with the associated scintillator.

5. In a scintillation detector for a CT scanner, the improvement comprising, a pair of scintillators, a collimator plate having a pocket formed in each face thereof, the pockets being dimensioned to receive a scintillator and having a protective wall for shielding the longitudinal corner of the scintillator, one of the scintillators being mounted in each pocket with the corner thereof shielded to prevent X-radiation from impinging on said corners or bypassing said scintillator, a photosensor having a base support and a first and second active diode surface carried on said base support, the active surfaces being spaced by about the thickness of the collimator plate and having a rectangular shape about the same as the scintillator face, the collimator plate having a pair of opposed legs, and the base support having a pair of opposed slots dimensioned to receive the spaced legs for supporting each of said active surfaces in accurate registration with its associated scintillator.

6. In a scintillation detector array for a CT scanner, the improvement comprising, a pair of opposed detector end members carrying a plurality of slots aligned to intercept a swath of radiation, a plurality of scintillators, a plurality of first and second collimator plates, said collimator plates having pockets formed in each face thereof, the pockets being dimensioned to receive a scintillator and having a protective wall for shielding the longitudinal corner of a received scintillator, means for affixing the scintillators within the pockets of the first collimator plates with the protective walls shielding the associated scintillator corners, said first and second collimator plates being fit within opposed slots in the end members in alternating arrangement to define a plurality of cells in which one corner of each scintillator is shielded by the protective wall of a first associated collimator plate and the other corner of each scintillator is shielded by the protective wall of the second associated collimator plate adjacent to said first collimator plate.

7. The improvement as set out in claim 6 further including a plurality of photosensors each having a base support and a first and second active surface carried on said base support for association with two adjacent scintillators carried in the pockets of said first collimator plates, the first collimator plates having a pair of opposed legs for supporting a photosensor, said base support having registration means which mate with said opposed legs of said first collimator plate so that each of said active surfaces of said photoresponsive means assembly is held in accurate registration with its associated scintillator.

8. The improvement as set out in claim 7 wherein said registration means is a pair of slots on each end of said base support, said slots being dimensioned to engage the legs on a collimator plate to hold each of said active surfaces of said photosensor in accurate registration with its associated scintillator.

* * * * *